(12) United States Patent
Wood et al.

(10) Patent No.: US 9,321,120 B2
(45) Date of Patent: Apr. 26, 2016

(54) PLASMA CUTTING METHOD AND SYSTEM

(71) Applicants: Daniel L. Wood, Deerfield, IL (US);
Ronald K. Worth, Deerfield, IL (US)

(72) Inventors: Daniel L. Wood, Deerfield, IL (US);
Ronald K. Worth, Deerfield, IL (US)

( * ) Notice: Subject to any disclaimer, the term of this patent is extended or adjusted under 35 U.S.C. 154(b) by 214 days.

(21) Appl. No.: 13/907,668

(22) Filed: May 31, 2013

(65) Prior Publication Data

US 2013/0319978 A1 Dec. 5, 2013

Related U.S. Application Data

(60) Provisional application No. 61/653,837, filed on May 31, 2012.

(51) Int. Cl.
*B23K 10/00* (2006.01)

(52) U.S. Cl.
CPC ............... *B23K 10/00* (2013.01); *B23K 10/006* (2013.01)

(58) Field of Classification Search
CPC ........ B23K 10/006; B23K 10/00; H05H 1/26; H05H 1/36; H05H 1/34
USPC ............. 219/121.39, 121.44, 121.54, 121.56, 219/121.57, 121.59
See application file for complete search history.

(56) References Cited

U.S. PATENT DOCUMENTS

| | | | | |
|---|---|---|---|---|
| 5,326,955 A * | 7/1994 | Nishi et al. | ................ | 219/121.56 |
| 5,653,895 A * | 8/1997 | Shintani | ..................... | 219/121.5 |
| 6,326,583 B1 * | 12/2001 | Hardwick et al. | ........ | 219/121.55 |
| 6,947,802 B2 * | 9/2005 | Picard et al. | .................. | 700/117 |
| 7,071,441 B1 * | 7/2006 | Bulle | ...................... | 219/121.39 |
| 8,525,067 B2 * | 9/2013 | Muscat-Tyler et al. | .. | 219/121.44 |

* cited by examiner

*Primary Examiner* — Mark Paschall
(74) *Attorney, Agent, or Firm* — Jeffrey A. Pine; Dykema Gossett PLLC

(57) ABSTRACT

A plasma cutting system for measuring or monitoring the voltage between a plasma torch and the material being cut to determine a voltage or voltage signature and comparing that measurement against predetermined values to indicate that an initial pierce of the material is complete, and based on the measurement, moving the torch or the material to a different location for additional cutting.

9 Claims, 5 Drawing Sheets

PLASMA CUTTING METHOD AND SYSTEM

FIELD OF THE INVENTION

The instant disclosure relates to plasma cutting. More specifically, the instant disclosure is related to voltage-based movement timing of a plasma torch in plasma cutting.

BACKGROUND OF THE INVENTION

It is known to use a plasma cutter to cut a material, such as, for example only, steel, sheet metal, aluminum, and the like. In general, plasma cutting is performed by projecting an inert gas or compressed air from a source through a plasma torch nozzle towards the surface of the material to be cut, and simultaneously driving an electrical current through the gas or air by applying a voltage between the cutter and the material to form a plasma within the projected gas or air. The generated plasma is hot enough that it can be used to cut a variety of different materials.

In general plasma cutting systems typically include a power supply, ground, and a torch and can be used manually to cut the material. However, Computer Numerical Controlled (CNC) plasma cutting systems employ additional hardware and software to facilitate automated and often more precise material cutting. An exemplary system uses control hardware and software along with rails, carriages, gantries and stepper motors to control the motion along the movement axis for precision cutting. Exemplary embodiments of a plasma cutter and material are shown in FIGS. 1 and 2.

When a plasma cutter first turns on and begins cutting a material, it takes time for the plasma jet to pierce through the material (i.e., to achieve an adequate Z-plane depth of the cut). During this time, the plasma needs to stay stationary with respect to the material before it can be moved to continue the cutting of the material (i.e., in the XY plane). The time for this initial piercing can vary according to the properties and thickness of the material to be cut, along with the characteristics of the plasma cutting device, such as, the power of the plasma system, nozzle geometry, and other factors.

One known method for determining the amount of time for this initial piercing to occur is to estimate the amount of time based on past experimental data, which can be then used to create a look-up table based on the characteristics of the material and of the plasma cutting system. However, such look-up tables can be imprecise resulting in insufficient cutting. If the time given in the table is too long, there will be a larger-than-desired dilated hole at the beginning of the cut. If the time in the table is too short, the plasma may not cut all the way through the material at the beginning of a cut. Also, the look-up table may not take into account variable thicknesses in the material being cut.

There is therefore a need for an improved system, device, and method for determining the proper amount of time to spend at a cutting location with a plasma cutter.

SUMMARY OF THE INVENTION

The present invention utilizes the voltage across the plasma arc, i.e., between the plasma torch and the material being cut, for determining the appropriate timing for moving the plasma torch with respect to the material being cut. The present disclosure contemplates that a complete pierce of the material is generally accompanied by a particular voltage signature, for example, a sharp decrease in the voltage across the plasma arc, a known discrete voltage value, or a rate of change of the voltage. Thus, the present invention involves monitoring the voltage between a plasma torch and the material being cut, and moving the plasma torch, with respect to the material, when a particular voltage signature, such as a predetermined threshold or decrease in voltage, is detected.

BRIEF DESCRIPTION OF THE DRAWINGS

The preferred embodiments of the invention will be described in conjunction with the appended drawings, which illustrate and do not limit the invention, where like designations denote like elements, and in which.

DETAILED DESCRIPTION OF THE INVENTION

In general, plasma cutting is performed by projecting an inert gas or compressed air from a plasma torch nozzle towards the surface of the material to be cut, and driving an electrical current through the gas by applying a voltage between the cutter and the material to form a plasma within the projected gas. The plasma is hot enough that it can be used to cut a variety of different materials.

Figure 1:
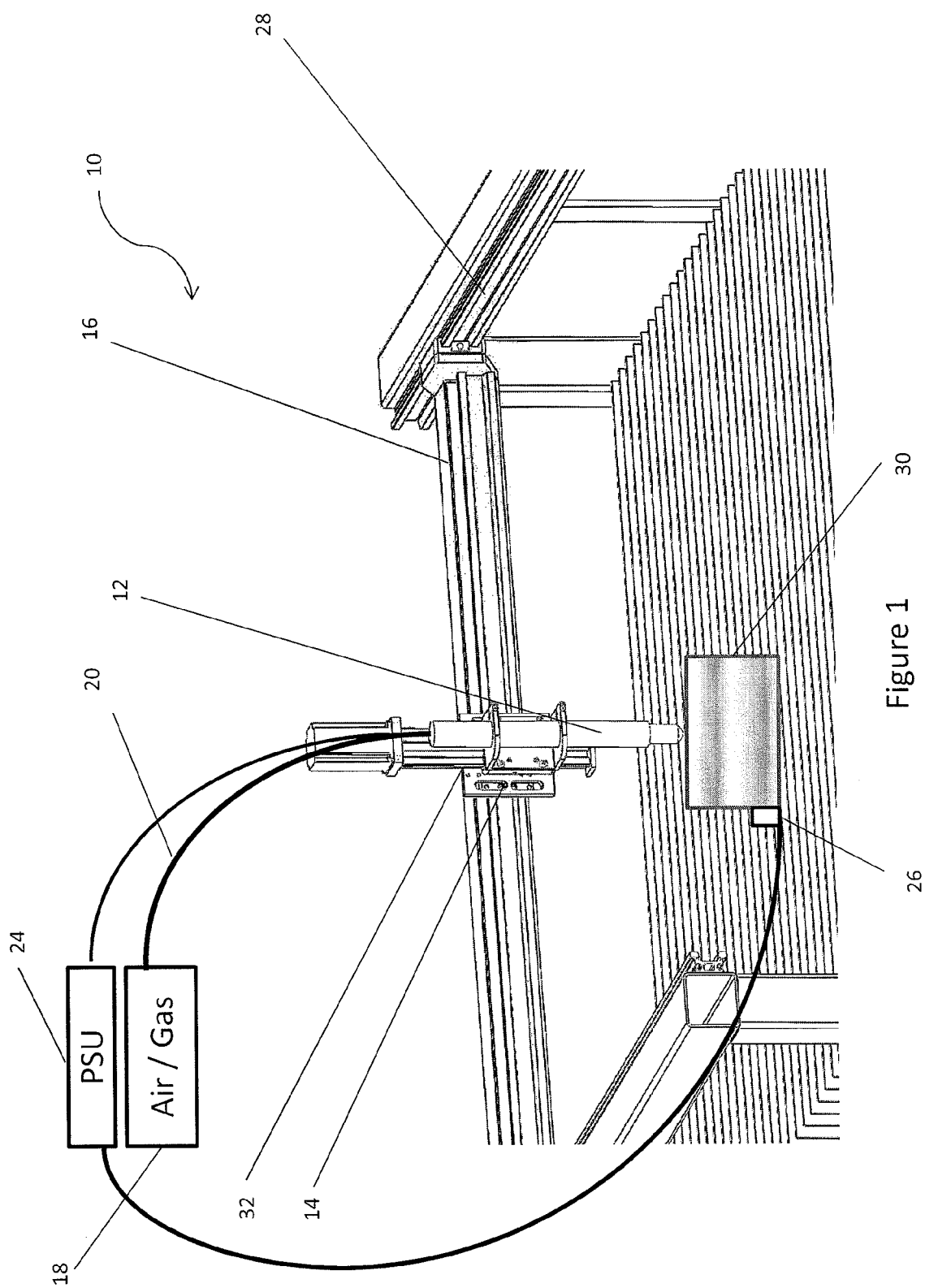
FIG. 1 is a plasma cutting machine with a plasma torch and material that has been cut.

FIG. 1 shows an exemplary plasma cutting system 10 for cutting different types of materials as described herein. The plasma cutting system 10 includes a plasma torch 12 along with the torch carriage assembly 14, gantry 16, which allows the torch carriage assembly 14 to move along an axis, a rail system 28 for moving the gantry 16 and torch carriage assembly 14 along a different axis, an air/gas supply 18, a flexible conduit 20 for air or gas delivery to the plasma torch 12, a power supply 24, and a ground clamp 26, all for use in cutting material 30 using the plasma cutting system 10.

Figure 2:
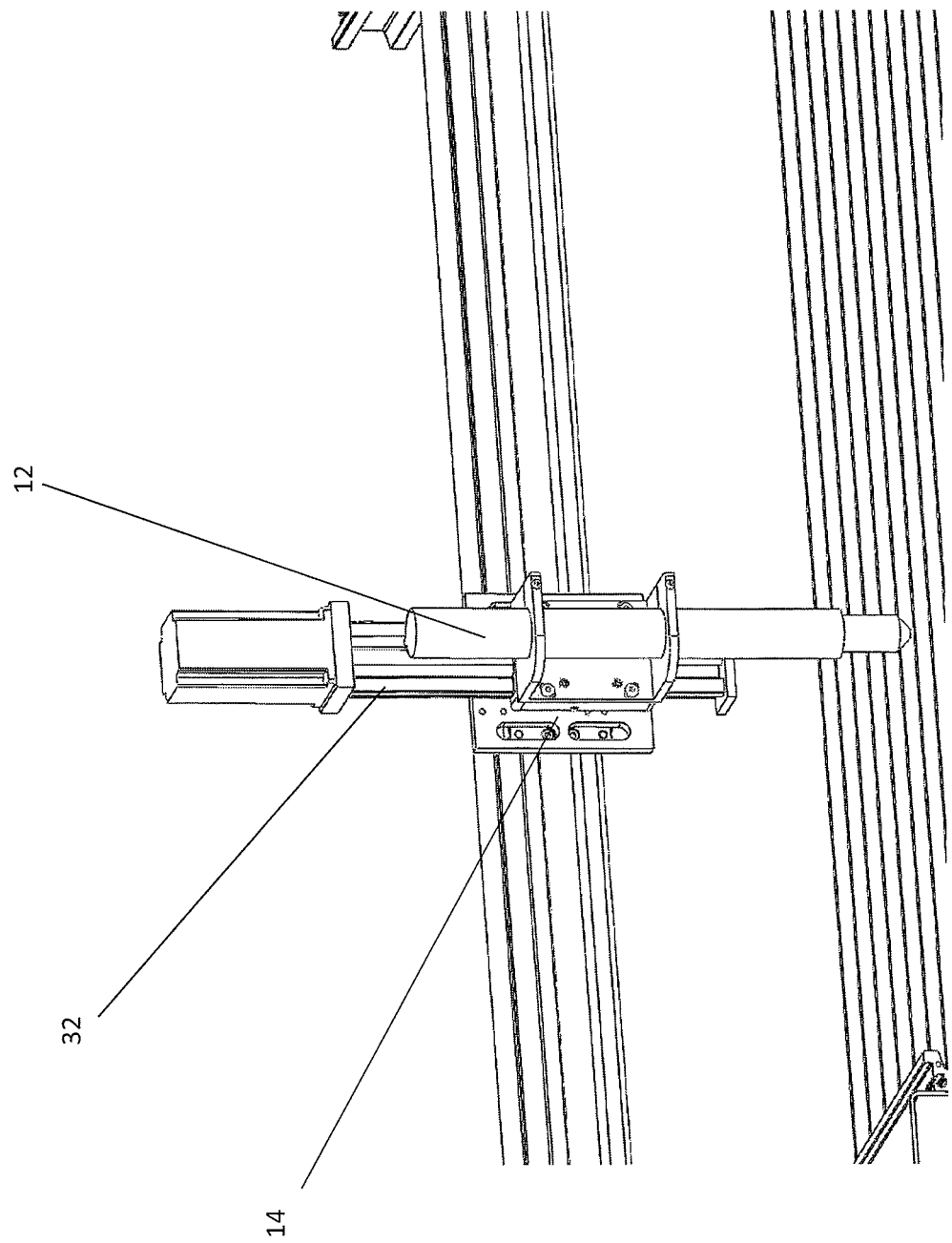
FIG. 2 is a plasma torch on material to be cut.

FIG. 2 shows a close up view of the plasma cutting system 10 in which the plasma torch 12 is positioned normal to the cut material 30. In this exemplary system, the gantry 16 moves in the X direction and the rails 28 move in the Y direction. The carriage gantry 32 moves the plasma torch 12 in the Z direction or the axis normal to the cutting surface 30.

When the plasma torch 12 first turns on, it takes time for the plasma to pierce through the material (i.e., to achieve an adequate Z-plane depth of the cut). The plasma needs to stay stationary during this time before it can move parallel to the plane of the material (i.e., in the XY plane) to continue the cut. The torch stays stationary until the material 30 is pierced. The present invention monitors the voltage between the plasma torch 12 and the material 30 (the plasma arc voltage), for a particular voltage signature, a sharp decrease in the voltage across the plasma arc, a known discrete voltage value, or a rate of change of the voltage. Thus, the present invention involves monitoring the voltage between a plasma torch and the material being cut, and moving the plasma torch 12 upon a particular predetermined value or signature, such as a discrete threshold or decrease in voltage.

Figure 3:
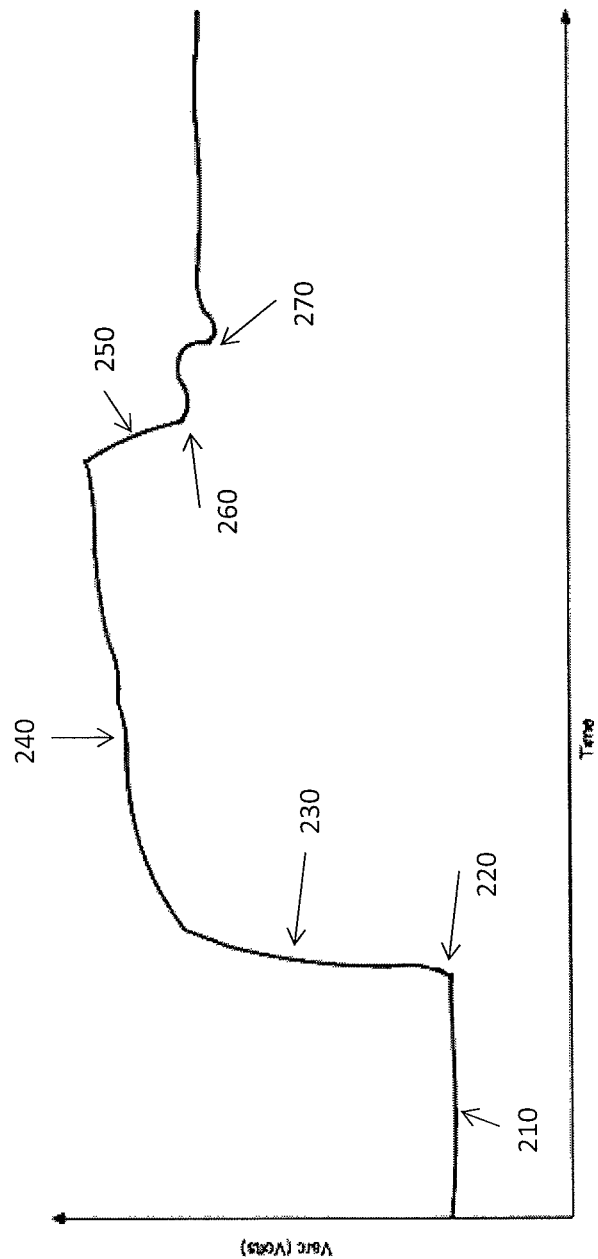
FIG. 3 is a voltage versus time graph illustrating an exemplary voltage between a plasma cutter and a material being cut before, during, and after an initial piercing of the material.

FIG. 3 is a graph indicating a voltage between a plasma torch 12 and a material being cut 30, the plasma arc voltage ($V_{arc}$) before, during, and after cutting the material. Initially after the material has been located in the XY plane, the plasma torch 12 is moved in the Z plane to the appropriate height for an initial pierce of the material 210. The torch carriage assembly 14 is positioned along the gantry 16 movement axis, and the gantry 16 is positioned along the rail movement axis 28. In the exemplary system shown in FIG. 1, the gantry 16 movement axis is the X axis and the rail movement axis 28 is the Y axis. The pierce height is then adjusted to a predetermined level using the carriage gantry 32.

The plasma torch 12 is then activated to begin the initial pierce 220. In doing so, the power supply 24 supplies power to the plasma torch electrode (not shown). The inert gas or compressed air passing through the plasma torch 12 is then subjected to the voltage creating an arc. Once heated to the proper temperature an inert gas or compressed air changes to a plasma that is forced towards the cut material 30 through the plasma torch 12.

The arc voltage is then measured and used to determine whether or not the pilot arc ignition has been started 230. As described below, the measurement is compared to a predetermined value and/or the change in voltage over time is compared to a predetermined differential value. For example, the measured voltage at this time may be about −130V. As known by one having ordinary skill in the art, the voltage measurement may be positive or negative and the comparison can be done using absolute values if desired.

To the extent the pilot arc ignition has been started, the voltage is continued to be measured to detect whether the power amplifier is applying power 240 to the plasma torch 12. As described below, that measurement is compared to a different predetermined value and/or the change in voltage over that time is compared to a different predetermined differential value. For example, the measured voltage at this time may be about −160V.

The voltage continues to be measured (e.g., while driving a constant or predetermined current) for a voltage signature indicating that the pierce drilling is in progress 250. As described in detail below, the voltage measurement at this time is compared to yet another predetermined value and/or the change in voltage over time is compared to another predetermined differential value. In this case, the comparison is to determine when the measured value is less than or equal to the predetermined values.

After the material has been pierced 260, the plasma torch 12 can be moved to the appropriate height in the Z plane for continuous cutting. The voltage measurement at this time generates the set-point 270. The Automatic Torch Height Control (ATHC) system can then be used to maintain z-axis height based on the set-point 270. The plasma cutting procedure can continue for the particular cut based on the set-point 270 until the cutting is complete.

Figure 4:
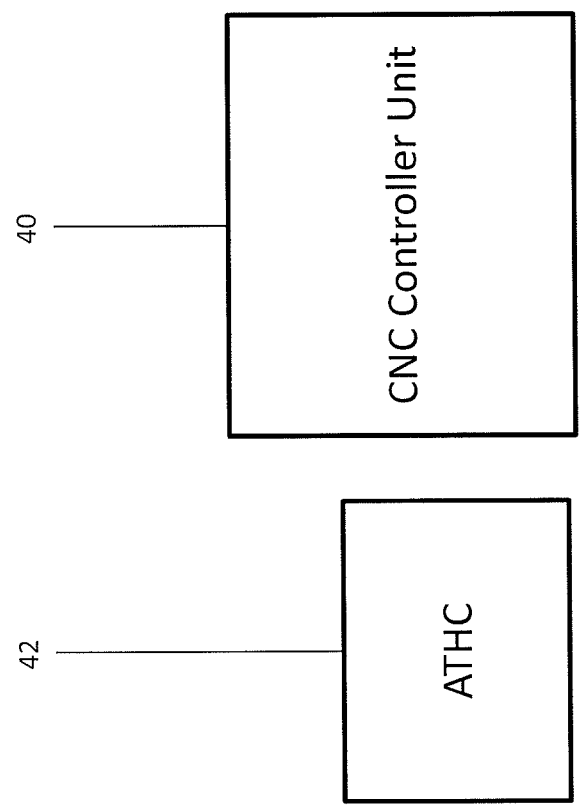
FIG. 4 is an exemplary computer numerical controller and height controller for a plasma cutting device in accordance with the present invention.

FIG. 4 shows a Computer Numerical Controller (CNC) 40 and height controller 42 for a plasma cutting system 10. The height controller can be configured to adjust the height of a plasma torch according to the voltage of the plasma arc, as described herein.

Figure 5:
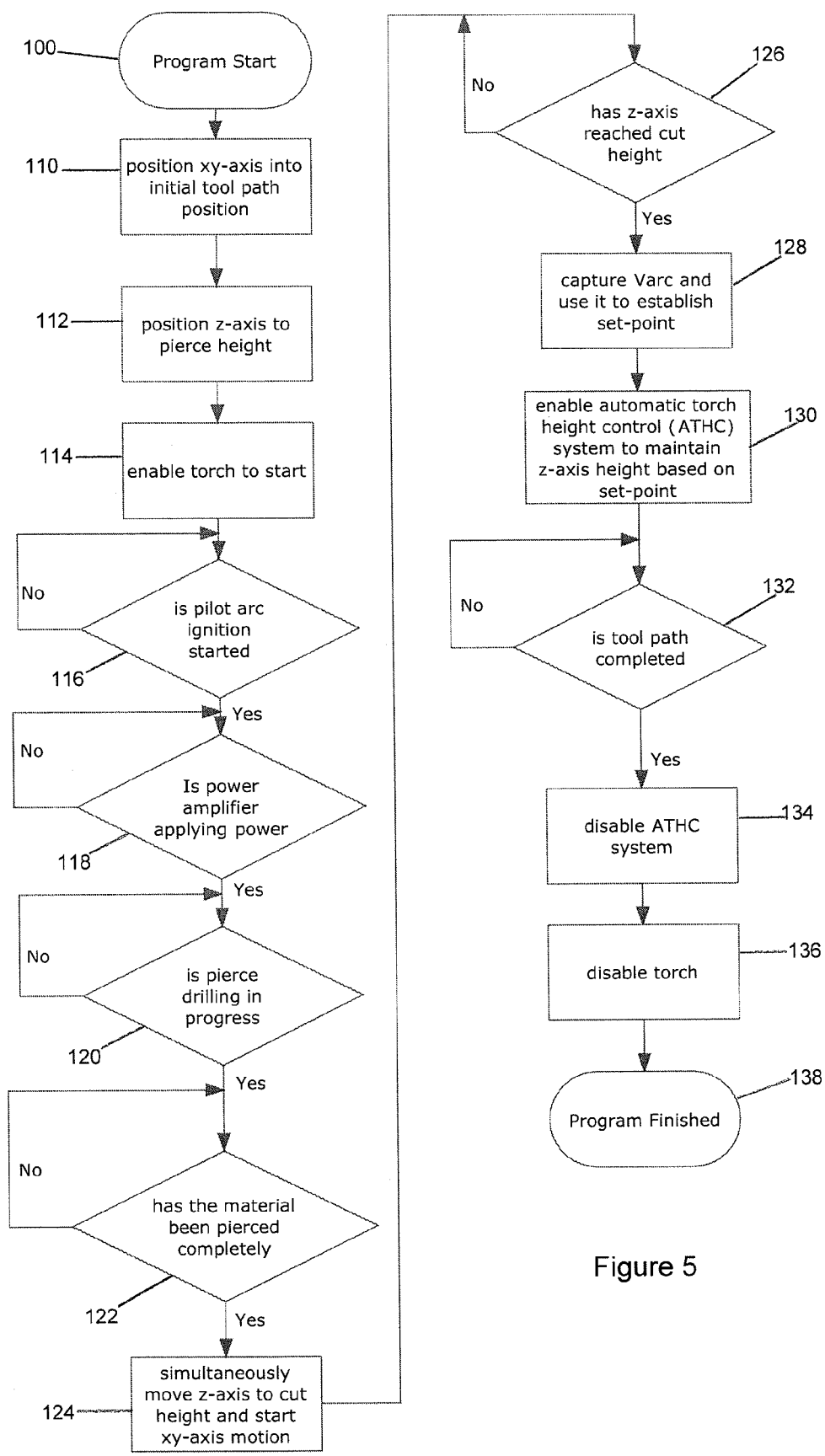
FIG. 5 is a flow chart indicating the steps of an exemplary method of performing a cut of material using a CNC plasma cutting device in accordance with the present invention.

FIG. 5 is a flow chart indicating an exemplary method of performing a cut with a plasma cutter in accordance with the present disclosure and as shown with respect to the exemplary graph shown on FIG. 3. As shown, the plasma cutting system 10 as described above and the program used to assist with the cutting begins the operation of cutting the material at step 100. Initially, the tool is moved into the proper XY position with respect to the material to be cut at step 110, which can be done by moving the material on an XY bed, or moving the plasma torch 12 in relation to the material. This step continues until the plasma torch is in the proper location. Once the plasma torch is in the correct XY location, the movement is stopped and the information may be saved for future use.

Next, the plasma torch 12 can be moved to the initial piercing height, to the extent it is not already in that location, and the plasma torch is moved in the Z-direction to the proper height for the initial pierce of the material at step 112. At this time $t_1$ (see FIG. 3 210), the plasma torch is in the correct XY location and at the correct height Z to begin piercing through the material. These steps can be accomplished in this order, or done in reverse order or performed simultaneously.

The program then turns on the plasma torch at step 114 at time $t_2$ (see FIG. 3 220), and as described above, a gas or air is sent from a source (not shown), through a flexible conduit 20 and through the plasma torch 12 to generate the plasma for cutting.

The plasma cutting program then detects the beginning of the piercing of the material in order to ensure that the pilot arc ignition has been started at step 116 at time $t_3$ (see FIG. 3 230). This is accomplished by measuring the of the arc voltage ($V_{arc}$), the voltage between the plasma torch 12 and the ground clamp 26, coupled to the material being cut. The absolute value of the arc voltage must be greater than or equal to a predetermined $V_3$ voltage for a preset period of time $t_3$. Alternatively (or additionally), the rate of change of $V_{arc}$ for time $t_3$, or the differential of the voltage measurement over time ($dV_{arc}/d_{t3}$) should be greater than or equal to the predetermined differential value of $V_3$. If this does not occur, a failure signal can be sent to the user and the program can go back to rerun the pilot arc ignition test or the system can shut down.

If the pilot arc ignition has been started (step 116), the program then detects that the power amplifier is applying power at step 118 at time $t_4$ (see FIG. 3 240), by again measuring the absolute value of the $V_{arc}$ to determine that it is above or the same as the $V_4$ predetermined voltage and/or that the rate of change of $V_{arc}$ for time $t_4$, or the differential of the voltage measurement over time ($dV_{arc}/d_{t4}$) is greater than or equal to the predetermined differential value of $V_4$. Again, if this does not occur, a failure signal can be sent to the user and the program can go back to rerun the power amplifier test or the system can shut down.

Next, the program detects whether the pierce drilling is in progress at step 120 at time $t_5$ (see FIG. 3 250). In other words, the program determines when the plasma torch 12 is piercing the material at that location. To accomplish this test, again the absolute value of the arc voltage is measured and to see if the arc voltage is less than or equal to the $V_5$ predetermined voltage and/or that the rate of change of $V_{arc}$ for time $t_5$, or the differential of the voltage measurement over time ($dV_{arc}/d_{t5}$) is less than or equal to the predetermined differential value of $V_5$. The program continues to detect this voltage until the measurement equals or is less than the predetermined values.

Next, the program can additionally detect whether the material has been pierced completely at step 122. To accomplish this, the arc voltage is measured to see if $V_{arc}$ is at or below the $V_6$ predetermined voltage and/or the rate of change of the arc voltage ($dV_{arc}/d_{t6}$) has declined to or below a predetermined differential value of $V_6$. Once this occurs the material has been pierced.

Now that the material has been pierced the plasma torch 12 can be moved to the next location with respect to the material at step 124 immediately after time $t_6$ (see FIG. 3 260). As described above, this movement can be in one or more of the X, Y and Z directions, and can occur in any order. The program next determines if the plasma torch is at the proper height for cutting the material at step 126 and will continue to move the plasma torch 12 until it is at the proper location for cutting.

Once the plasma torch 12 is at the proper cut height, the program can determine the arc voltage and use that voltage to establish a set-point for cutting the material at step 128 at time $t_7$ (see FIG. 3 270). Once the set-point is established, the program can proceed at the cut height or it can utilize that set-point with an automatic torch height control (ATHC) system to maintain the height or Z-axis based on that set-point at step 130. The program continues to cut the material until it determines when the plasma torch 12 path or the cut is complete at step 132 and disables the ATHC at step 134, disables or shuts down the plasma torch at step 136 and ends the program at step 138, and gets ready for the next cut.

Exemplary values for a preferred embodiment of a plasma cutting system described herein, such as the Hypertherm Powermax 45, generating 45 amps and cutting through 3/16" mild steel, would be a range for $V_3$ of approximately −50 volts to −100 volts, with an exemplary voltage of about −72 volts, and $t_3$ would be in an approximate range of 0.1 ms to 500 ms, with an exemplary time of 2 ms for determining if the pilot arc ignition has started 116. The system would use as an example a range for $V_4$ of approximately −100 volts to −400 volts, with an exemplary voltage of approximate −260 volts, and $t_4$ would be in an approximate range of 0.2 ms to 20 ms, with an exemplary time of 0.8 ms to determine if the power amplifier was applying power 118. For determining whether the material has been pierced, the system would use as an example a range for $V_5$ of approximately −400 volts to −100 volts, with an exemplary voltage of −320 volts (due to a spike in voltage) and a $t_5$ would be in an approximate range of 0.5 ms to 10 ms, with an exemplary time of 1.2 ms. This exemplary system would detect and maintain a cutting voltage range of between −85 volts to −150 volts, with an exemplary value of −118 volts for example, and use that value with the ATHC until the cut was finished. These values are for exemplary purposes only and will vary based on the type of plasma torch and material used, the applied voltage, among other variables.

Although a number of embodiments of this invention have been described above with a certain degree of particularity, those skilled in the art could make numerous alterations to the disclosed embodiments without departing from the spirit or scope of this invention. For example, all joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. Further, the order of steps is not necessarily limited to the order set forth in the preferred embodiment or in any alternative embodiment.

It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A method for cutting material using a plasma torch and measuring the voltage from the plasma torch to the material to be cut, comprising the steps of:
   a. positioning the plasma torch in a location with respect to the material to be cut;
   b. igniting the plasma torch;
   c. checking that the pilot arc ignition has started by measuring the voltage from the plasma torch to the material to be cut and determining if the measured value is greater than the absolute value of a first predetermined value;
   d. checking that the pierce drilling is in progress;
   e. checking that the material has been pierced;
   f. once the material has been pierced based on the measured value, automatically starting to move or continuing to move the plasma torch to a new location on the material, away from the pierce, while cutting the material; and
   g. after moving the plasma torch to said new location, measuring the voltage from the plasma torch to the material to be cut to determine a set-point based on said measured voltage.

2. The method for cutting material using a plasma torch and measuring the voltage from the plasma torch to the material to be cut of claim 1, wherein the first predetermined value is approximately −72 volts.

3. The method for cutting material using a plasma torch and measuring the voltage from the plasma torch to the material to be cut of claim 1, wherein checking that the pierce drilling is in progress is done by measuring the voltage from the plasma torch to the material to be cut and determining if the measured value is greater than the absolute value of a second predetermined value.

4. The method for cutting material using a plasma torch and measuring the voltage from the plasma torch to the material to be cut of claim 3, wherein the second predetermined value is approximately −260 volts.

5. The method for cutting material using a plasma torch and measuring the voltage from the plasma torch to the material to be cut of claim 1, wherein checking that the material has been pierced is done by measuring the voltage from the plasma torch to the material to be cut and determining if the measured value is less than the absolute value of a third predetermined value.

6. The method for cutting material using a plasma torch and measuring the voltage from the plasma torch to the material to be cut of claim 5, wherein the third predetermined value is approximately −320 volts.

7. The method for cutting material using a plasma torch and measuring the voltage from the plasma torch to the material to be cut of claim 1, wherein positioning the plasma torch in a location with respect to the material to be cut comprises moving the material to be cut in the X, Y and Z direction.

8. The method for cutting material using a plasma torch and measuring the voltage from the plasma torch to the material to be cut of claim 1, wherein positioning the plasma torch in a location with respect to the material to be cut comprises moving the plasma torch in the X, Y and Z direction.

9. The method for cutting material using a plasma torch and measuring the voltage from the plasma torch to the material to be cut of claim 1, wherein positioning the plasma torch in a location with respect to the material to be cut comprises moving either the plasma torch or the material to be cut in the X, Y and Z direction.

* * * * *